United States Patent [19]

Fisher

[11] Patent Number: 4,753,305
[45] Date of Patent: Jun. 28, 1988

[54] CUTTER MOUNTING FOR DRAG BITS

[75] Inventor: John G. Fisher, Irving, Tex.

[73] Assignee: Dresser Industries, Inc., Dallas, Tex.

[21] Appl. No.: 52,006

[22] Filed: May 19, 1987

[51] Int. Cl.$^4$ ............................................. E21B 10/46
[52] U.S. Cl. ................................. 175/410; 76/108 A; 175/329
[58] Field of Search .................... 175/329, 330, 410; 76/108 A, 101 E

[56] References Cited

U.S. PATENT DOCUMENTS

| | | | |
|---|---|---|---|
| 4,431,065 | 2/1984 | Andrews | 175/410 X |
| 4,442,909 | 4/1984 | Radtke | 175/329 |
| 4,499,958 | 2/1985 | Radtke et al. | 175/329 |
| 4,574,895 | 3/1986 | Dolezal et al. | 175/329 |
| 4,593,777 | 6/1986 | Barr | 175/329 X |
| 4,676,124 | 6/1987 | Fisher | 175/410 X |
| 4,679,639 | 7/1987 | Barr et al. | 175/329 |

*Primary Examiner*—Jerome Massie
*Assistant Examiner*—Hoang C. Dang
*Attorney, Agent, or Firm*—Roy L. Van Winkle

[57] ABSTRACT

An improved method and apparatus for supporting a cutting member in a drag bit wherein the cutting member includes a cylindrical stud or body having an angularly disposed cylindrical portion projecting therefrom with a cutting wafer bonded to the face of the cylindrical portion. A hole is formed in the bit body with an angular recess intersecting the hole. The recess conforms generally to the configuration of the cylindrical portion so that in the preferred form of the invention, the bit body engages the cylindrical portion to prevent rotation of the cutter in the bit body. Also, the engagement between the bit body and the cylindrical portion occurs in such a matter as to avoid a contact between the bit body and the wafer thus avoiding imposing stresses on the cutting wafer. The engagement aids in preventing fluid erosion and in orienting the cutting member in the bit body during assembly.

9 Claims, 2 Drawing Sheets

CUTTER MOUNTING FOR DRAG BITS

BACKGROUND OF THE INVENTION

1. Field of the Invention

This invention relates to a drag bit having stud-mounted polycrystalline diamond (PDC) cutting elements and more particularly, to an improved structure for securing the cutting elements within the body of the bit.

2. Description of the Prior Art

Stud-mounted polycrystalline diamond cutting elements are readily commercially available, one such being a STRATAPAX cutting element from General Electric. Such PDC cutting elements generally comprise a cylindrical stud of tungsten carbide having an angular planar face formed at one end of the stud. A generally cylindrical wafer of tungsten carbide is brazed onto the planar face with the opposite exposed face of the wafer comprising a layer of polycrystalline diamonds.

In fabricating a drag bit utilizing such PDC cutters, the body of the bit has cavities open to the surface with such cavities generally corresponding to the diameter of the cylindrical stud. The PDC cutter is then oriented within the cavities such that the polycrystalline diamond surface faces in the direction of rotation of the bit. Although in some bit bodies the studs are press-fit within the cavities, it is also well known to retain the studs by brazing, with a well known brazing material, such as by placing the studs in contact with brazing material prior to insertion or subsequent to placing the studs into the cavities and properly orienting them prior to subjecting the bit body and assembled cutting elements to a brazing temperature.

During brazing and during initial assembly or pressing of the cutting elements to the bit, a substantial problem with maintaining the proper orientation has occurved. Improper orientation can significantly reduce the drilling speed and life of the bit. The elements tend to rotate and, when subjected to drilling forces during use, the elements become loosened and may be lost from the bit.

The angular planar surface formed in the stud on which the wafer is mounted, and the exposed exterior end of the tungsten carbide stud, which is normally rounded to generally conform to the cylindrical surface of the wafer mounted on the planar surface, provide surfaces which, when the stud is seated within the cavity, terminate below the surface of the bit body such that the dissimilar geometries of the bit body and such surfaces define various voids below the surface of the bit and adjacent the internal wall of the cavity. During boring or drilling conditions, wherein highly abrasive drilling fluid is circulated across the bit face and adjacent the cutters to remove the cuttings and cool the cutter, the high velocity fluid enters these voids with such velocity that it causes erosion of the bit body and also permits erosive attack of the brazed joint between the bit body and cutting element brazing. Such action ultimately washes out the support around the cutter to the extent that quite often the cutter is released from the bit body with substantial deleterious effect on the ability of the bit to continue drilling.

SUMMARY OF THE PRESENT INVENTION

According to the present invention, the cutter is located in the bit body so that the bit body engages the cylindrical wafer to support the cutter against rotation relative to the bit body and the cutter is recessed into the bit body so that the cylindrical wafer fits very closely into the bit body preventing the entrance of drilling fluid into the voids and, thereby, avoids the errosion problems.

DESCRIPTION OF THE PREFERRED EMBODIMENT

Figure 1:
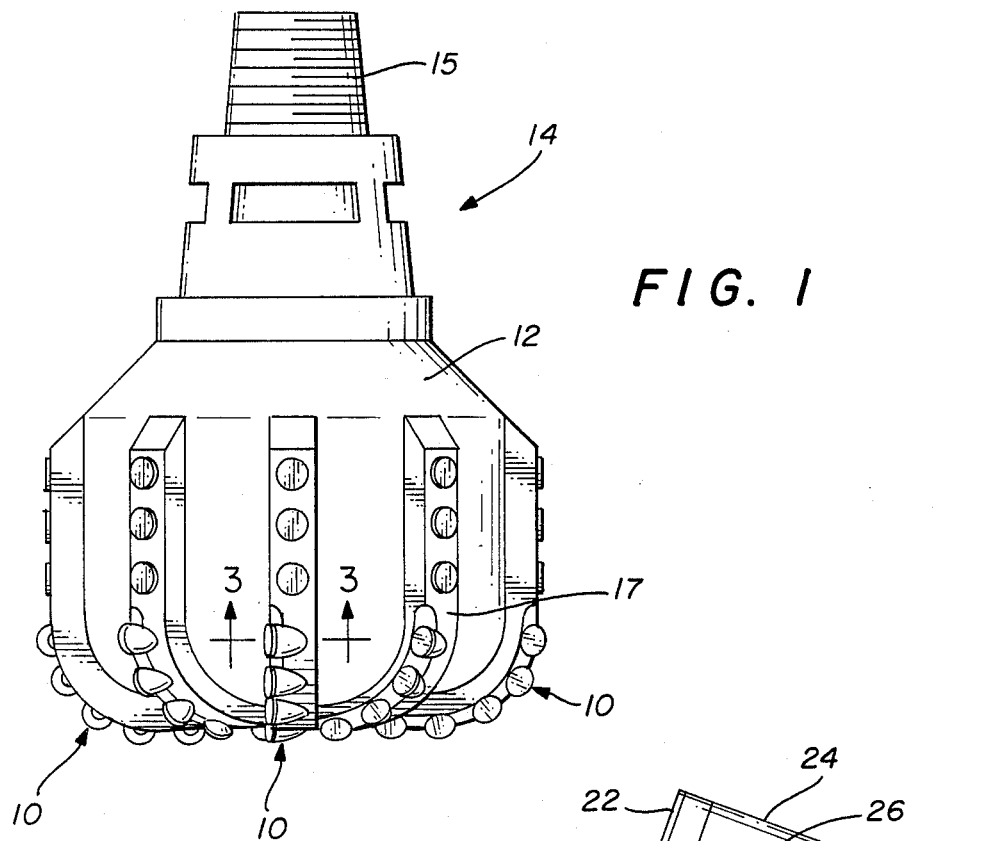
FIG. 1 is a typical drag bit having cutters mounted therein in accordance with the invention.

Referring to FIG. 1, a PDC cutting element 10 is mounted in the body 12 of a drag bit 14 that is shown in a simplified figuration for illustration only. The cutting element 10 (see FIG. 2 for detail) is well known, and comprises a cylindrical stud 16 formed of a tungsten carbide material having, adjacent one end thereof, an angled planar face 18 formed thereon. A generally cylindrical portion or tungsten carbide wafer 20 having opposed planar faces is bonded, as by brazing, to the angled face 18 of the stud 16 along one of its faces and a layer of polycrystalline diamond material or cutting wafer 22, forming the cutting face of the cutting element, is bonded to the opposite face. The exterior terminal end 24 of the cylindrical stud 16 adjacent the wafer 20 is generally contoured, such as at 26 to conform generally to the outer circular circumference of the wafer 20. Gage cutters may have flattened upper ends as required or desired.

The stud 16 is disposed within the body 12 of the bit 14 by being inserted in an appropriately sized cavity or hole 28 within the body, and oriented such that the surface of the cutting wafer 22 faces generally in the direction of rotation of the bit 14. In mounting the stud within such cavity, it is preferred to maintain a very close fit between the stud 16 and the cavity 28 to minimize the braze within the braze joint therebetween which in turn provides a brazed joint of maximum strength. One brazing technique is to locate brazing material in contact with the body 12 and each individual stud 16 or pre-tin the stud with a braze alloy, and subject the assembly, in a brazing furnace, to an elevated temperature sufficient to melt the braze alloy and have it flow throughout the joint, but below any temperature that would affect the braze joint of the wafer 20 on the stud 16 or damage the polycrystalline diamond materials.

Figure 2:
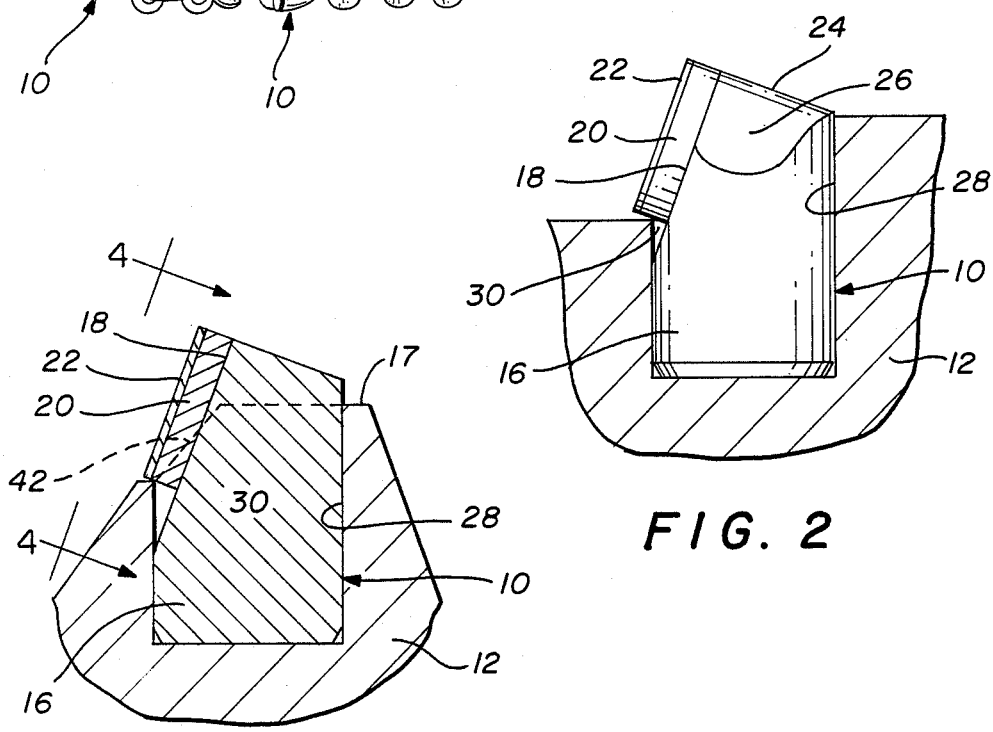
FIG. 2 is an elevational cross-sectional view of a polycrystalline diamond cutter mounted in a bit body and, as typical of the prior art, showing voids between the body and the cutter and lack of rotational support for the cutter.

Further as is seen in FIGS. 1 and 2, it is typical to mount the stud 16 in the cavity 28 such that the bit body 12 adjacent the terminal end 24 of the stud extends generally adjacent the portion of the angled surface 18 of the stud on which the wafer is mounted, and the bit body adjacent the curved portion 26 of the stud often is raised to provide additional back support. It will be noted in FIGS. 1 and 2 that under such conditions, there are junctures of dissimilar geometries between the bit surface and the stud that provide or define voids between the stud 16 and the internal wall of the cavity 28 in the bit body 12. Such voids are defined, as for instance, between the angled surface 18 and the walls of the cavity 28, as indicated at numeral 30 and between the contoured upper face 26 of the stud and the bit body as indicted at numerals 32, 34 (see FIG. 6).

Although the above is illustrative of typical voids between dissimilar geometries when mounting a cutter stud within a cavity of a bit body, as is well known in the prior art, other specific structures of prior art assemblies are well known which provide other, but similar, voids between the stud, or cutter body, and the wall of the cavity generally below the surface of the bit body. Gage cutters may have their top ends ground flat so that they do not extend a significant distance above the surface of the body and thus may not have the voids described above. Also, gage cutters may be slightly rotated relative to the cutting direction and require slightly different relief.

Exemplary of such structure is U.S. Pat. No. 4,265,324 which shows additional voids provided when a polycrystalline diamond cutting element is disposed in a cavity of a drag bit body having a surface at the same height at the front and rear of the element, and enlarging the cavity to accomodate sinking the lower edge of the diamond cutting surface below the bit surface.

In all such drag bits it is necessary, during the drilling operation in a well or the like, to maintain the cutting surface of the cutters relatively free from cuttings and also relatively as cool as possible. This is accomplished by flushing the bit surface with high velocity fluids such as drilling mud which is also well known to be highly abrasive.

To provide fluid to the bit 14, the bit is provided at its upper end 15 with a threaded portion for connection with a tubing string (not shown) that extends to the surface of the well and connects the bit with a mud pump (not shown). The mud pump provides mud under pressure to the bit 14.

Typically, drag bits are also provided on the body with a plurality of protrusions 17 into which the cutters 10 are installed. Such protrusions are often referred to as wings and may be cast in or welded on depending on the bit structure.

High velocity drilling fluid attacks the voids between the cavity 28 and the stud 16, and further attacks the relatively soft braze material at the brazed joint, with the end result being that the material of the bit body defining such voids is eroded and the voids are thereby enlarged to the extent that ultimately the studs 16 are no longer securely retained within the cavities and are the cutters 10 lost or twisted during drilling. Such cavity enlarging and wash-out is particularly critical in structure such as illustrated as cavity 30 in FIG. 2 wherein a relatively narrow portion of the bit body defines the cavity and is relatively quickly eroded away to expose the shank of the cutting element stud 16.

Figure 3:
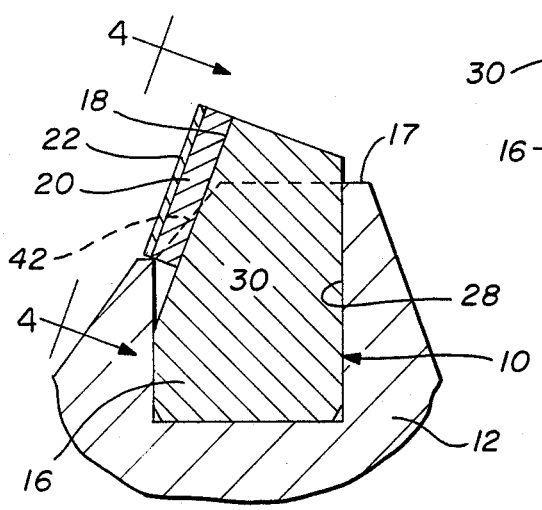
FIG. 3 is a view along line 3—3 of FIG. 1 showing a portion of the bit body and a cutter mounted in accordance with the invention.
Figure 4:
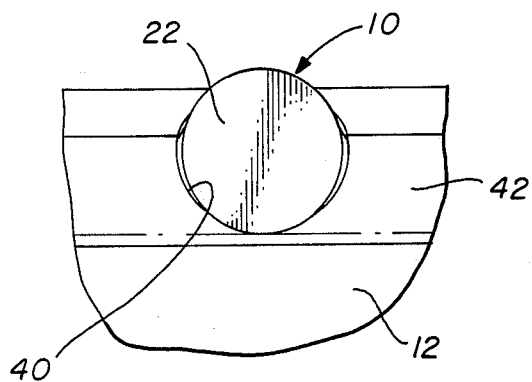
FIG. 4 is a view along a line 4—4 of FIG. 3 showing the cutter of FIG. 3 from a different angle.

In accordance with the present invention and with particular reference to FIGS. 3 and 4, the studs 16 are, as before, mounted within the cavities 28 of the bit body 12 in such a manner that, at the juncture of the dissimilar geometries, certain voids are defined between the bit body and the stud 16. Prior to brazing the stud 16 within the body, the voids may be filled with a powdered tungsten carbide material. The brazing of the stud 16 to the body 12 is then accomplished as in the prior art, whereby the bit body with the studs mounted therein is placed in a brazing furnace, with the brazing alloy in contact with the stud and bit body.

Thus, it can be seen that, in accordance with the present invention, the stud 16 is retained within the bit body 12 in a manner that reduces or eliminates the tendency of the high velocity drilling mud to attack the brazed joint between the stud 16 and the bit body by eliminating completely or limiting the size of the entrance to the voids. Although this procedure can be accomplished on either matrix body (cast or infiltrated) or steel body (machined) bits, it is desirable if brazing, to use braze material for unifying tungsten carbide powder placed in the voids that has a lower melting temperature than the melting temperature of any braze between the diamond cutting wafer and the stud, to avoid damage to the matrix or steel body or the polycrystalline diamond material (i.e. below approximately 1450° F.) when brazing.

Casting when used herein shall include a process referred to as "infiltration". Infiltration involves the filling of a mold with a powered metal and then melting an alloy which flows through the mold cavity and the powered metal forming the infiltered or cast product.

FIGS. 3 and 4 represent one method of mounting of the cutters 10 in the body 12, that is in the wings 17 of the body 12. As illustrated therein, the cutter 10 is located in the hole 28 which has been formed in the wing 17 during the casting or drilling of the body 12. In addition to the hole 28, a recess 40 is formed in the body 12 intersecting a hole 28. When the body 12 is made by the casting procedure, a core, which essentially duplicates the shape or volume of the cutter 10 that intersects the body 12, can be placed in the mold. Thus, the recess 40 very closely fits the exterior shape of the tungsten carbide wafer 20. It will be noted that the relief 42 forming the recess 40, (see FIG. 4) is set back from the cutting surface 22 as shown in FIG. 3 so that the engagement between the body 12 and the cutter 10 is in the cylindrical portion of the wafer 20. Thus, no load will be exerted on the polycrystalline diamond material forming the cutting wafer 22.

The intersection between the relief 42 and the hole 28 forms a substantially elliptical arc which intersects or engages the cylindrical surface of the wafer 20. The plane of the relief 42 is preferrably disposed at an angle approximately equal to the angular position of the generally elliptical arc of intersection. The relief 42 is formed on the wing 17 in the form of a plane extending down the front face of the wing 17 at an angle generally parallel to the plane of the elliptical arc.

In an ideal situation, the recess 40 will be the imaginary line forming the "intersection" between a cylinder of the diameter of the wafer 20 and a cylinder of the diameter of the stud 16 with the angular relationship of the two cylinders, the same as the angle between the stud 16 and wafer 20. It is most expedient to use the relief 42 to form the recess 40 to approximate the line of intersection between the two cylinders. Thus, the relief 42 is set at an angle to produce the generally elliptical arc previously described which closely approximates the ideal "intersection".

The cavity 30 which is formed between the hole 28 and the planar surface 18 on the stud 16 is essentially sealed by the engagement between the wafer 20 and the recess 40. Thus, no washing action will occur to destroy the brazing material securing the cutter 10 in the body 12. Additionally, the engagment provides a means of precisely locating the direction in which the cutting surface will face in relation to the wing 17. As previously mentioned, it may be desirable to rotate the cutters a slight amount.

Figure 5:
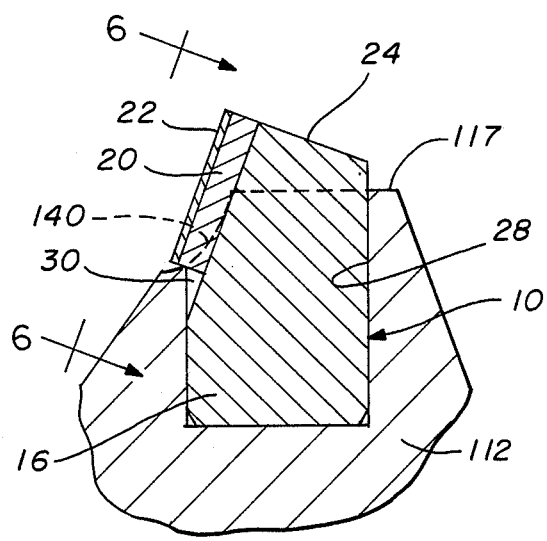
FIG. 5 is a view similar to FIG. 3, but showing the cutter mounted in a portion of a bit having a different recess configuration.
Figure 6:
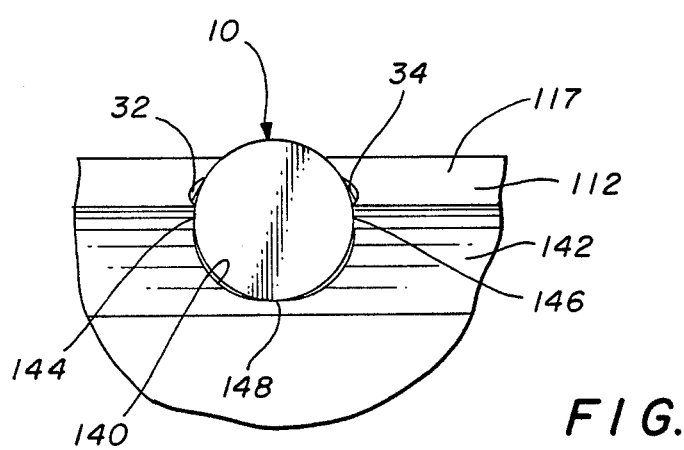
FIG. 6 is a view similar to FIG. 4, but taken along a line 6—6 of FIG. 5.

FIGS. 5 and 6 represent an additional method and structure for securing the cutting elements 10 in the body of the bit 14. The bit body in the additional embodiment is identified by the reference character 112. As illustrated in FIG. 5, a recess 140 is formed by the intersection between the hole 28 and a curved surface relief 142 which extends along a wing 117. As described with respect to the planar relief 42 producing a generally elliptical arc closely approximating the ideal "intersection", the curved relief 142 also produces the recess 140, which closely approximates the ideal "intersection", and also provides the desired alignment and support features.

The cutting element 10 is supported against rotation by its engagement at the end 114 and 146 of a chord of the wafer 20 and at the bottom 148 of the wafer 20 with the body 112. It should also be pointed out and as can be seen in FIG. 5, that the engagement between the surface 142 and the cutter 10 does occur in the wafer 20 to prevent damage to the cutting surface 22 while effectively preventing rotation of the cutter 10 in the hole 28.

Also shown in FIG. 6, and previously discussed, the hole 28 provides small cavities at the surface due the curved surface 26. These cavities are identified by the reference characters 32 and 34 and will be filled with brazing material which could includes powdered tungsten carbide or similar material. Such cavities are not in the critical areas and even if some washing action occurs, will not result in the loss of the cutter 10.

The foregoing description has referred to a cutter 10 that is composed of the cylindrical stud 16, the cylindrical wafer 20, and the cutting wafer 22 all brazed together. It should be pointed that the cutter 10 may be composed of the stud with an angularly protruding cylindrical portion made integrally with the cutting wafer bonded thereto. The shape of each may be the same.

The embodiments described in detail hereinbefore provide a cutting structure and method for construction, that avoids or substantially reduces the damage caused by erosion and that effectively supports the cutters against rotation while brazing, assembly for brazing or pressing and during use of the bit in the drilling of a well bore or the like.

The foregoing detailed description is presented by way of example only and many changes and modifications can be made thereto without departing from the spirit and scope of the invention.

What is claimed is:

1. Improved cutter means for rotatable drag bits including a bit body and a composite cutter that includes a generally cylindrical stud having an angularly projecting cylindrical portion thereon with a cutting wafer of different material bonded thereto, the improved cutter means comprising:
   at least one wing protruding from said body and aligned thereon in a direction generally perpendicularly to the direction of rotation of the bit;
   a hole in said wing for receiving said stud; and
   a relief in said wing on the side thereof facing the direction of rotation, said relief intersecting said hole providing an arcuate edge in said wing disposed along a generally elliptical arc formed by an imaginary line of intersection between the cylinder of said stud and the cylinder of said angularly projecting cylindrical portion and engaging said cylindrical portion at at least two points defined by a chord of said cylindrical portion thereby supporting said cutter against rotation in said hole.

2. The cutter means of claim 1 wherein said arcuate edge closely receives said cylindrical portion.

3. In an improved drill bit having a body defining a cutting face with cylindrical openings therein extending into said body for supporting in each opening a cutting element comprising a cylindrical stud having a cylindrical cutting disc bonded to a planar angularly oriented face formed on said stud and wherein said stud is received in said openings with a bonded cutting wafer located on said disc and oriented to face generally in the direction of drilling rotation of said bit, said improvement comprising means for positively locating and orientating said cutting wafer and protecting an unfilled volume bounded by the wall of said cylindrical openings and the angular planar face of said stud below said wafer from erosion by abrasive fluid action; said locating and protecting means comprising:
   a leading surface formed on the face of said body forwardly of and intersecting each cylindrical opening such that the intersection of the cylindrical wall of said opening and said leading surface defines an edge of generally elliptical arc having a vertex substantially tangent to a bottom cylindrical side of said cylindrical cutting disc for abutting and locating engagement therebetween when said cutting element is properly disposed within said opening and wherein the form of the leading surface is such that the body along said elliptical arc abuts said disc rearwardly of the cutting wafer whereby said engagement properly indexes said cutting element within said opening and seals said unfilled volume from direct errosion.

4. An improved method for mounting a composite cutter in a drag bit body wherein the composite cutter includes a cylindrical stud having an angularly projecting cylindrical portion thereon with a cutting wafer of different material bonded thereto, the method comprising the steps of:
   forming a hole in the bit body to accept the stud; and
   forming an edge in the bit body intersecting said hole along a generally elliptical arc formed by the projected intersection between the cylinder of said stud and the cylinder of said cylindrical portion; and
   locating said cutter in said hole with said cylindrical portion engaging said edge to prevent rotation of said cutter relative to said body.

5. The method of claim 4 wherein said edge is formed by intersecting said hole with a plane disposed at an angle approximately equal to the angular position of said elliptical arc.

6. The method of claim 4 wherein said edge is formed by intersecting said hole with a curved surface disposed at an angle thereby said edge approximates said elliptical arc.

7. The method of claim 4 wherein said edge and hole are formed by locating in a mold for forming the bit body a core having a shape and volume essentially the same as the shape of volume of the portion of said cutter that is disposed in said bit body.

8. The method of claim 4 wherein said hole is formed by drilling and said edge is formed by removing a portion of the bit body along a plane disposed at an angle to intersect said hole to form said generally elliptical arc.

9. The method of claim 4 wherein said hole is formed by drilling and said edge is formed by removing a portion of the bit body along a curved surface having its intersection with said hole generating said generally elliptical arc engaging said cylindrical portion at least two points on a chord of said cylindrical portion.

* * * * *

UNITED STATES PATENT AND TRADEMARK OFFICE
CERTIFICATE OF CORRECTION

PATENT NO. : 4,753,305

DATED : June 28, 1988

INVENTOR(S) : John G. Fischer

It is certified that error appears in the above-identified patent and that said Letters Patent is hereby corrected as shown below: On the title page Item (19)

Heading "Fisher," should be -- Fischer --.

"(75) Inventor: John G. Fisher, Irving, Tex.," should be
 -- "(75) Inventor: John G. Fischer, Irving, Tex. --.

Signed and Sealed this

Sixth Day of December, 1988

Attest:

DONALD J. QUIGG

Attesting Officer

Commissioner of Patents and Trademarks